United States Patent
Stephens

(10) Patent No.: US 7,483,691 B2
(45) Date of Patent: Jan. 27, 2009

(54) CALL OVERRIDE FEATURE FOR MOBILE PHONES

(75) Inventor: Debra K. Stephens, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 0 days.

(21) Appl. No.: 10/709,078

(22) Filed: Apr. 12, 2004

(65) Prior Publication Data

US 2005/0227671 A1  Oct. 13, 2005

(51) Int. Cl.
*H04Q 7/20* (2006.01)

(52) U.S. Cl. .................... 455/412.1; 379/67.1

(58) Field of Classification Search .............. 455/412.1; 379/67.1, 88.28
See application file for complete search history.

(56) References Cited

U.S. PATENT DOCUMENTS

| | | | |
|---|---|---|---|
| 4,941,203 A | | 7/1990 | Patsiokas et al. |
| 5,329,578 A | | 7/1994 | Brennan et al. |
| 5,559,860 A | * | 9/1996 | Mizikovsky ............... 455/413 |
| 5,784,444 A | * | 7/1998 | Snyder et al. ............. 379/142.01 |
| 5,903,628 A | * | 5/1999 | Brennan ................... 379/88.21 |
| 6,198,812 B1 | * | 3/2001 | Weber ..................... 379/142.04 |
| 2002/0015484 A1 | | 2/2002 | Sun-Young |
| 2005/0207560 A1 | * | 9/2005 | Speight .................. 379/266.07 |

OTHER PUBLICATIONS

Sony Ericsson Mobile Communications AB, "International Search Report" PCT/US04/035826, Mar. 15, 2005.
Sony Ericsson Mobile Communications AB, "Written Opinion of the International Searching Authority" PCT/US04/035826, Mar. 15, 2005.
Sony Ericsson Mobile Communications AB, International Preliminary Report on Patentability, corresponding to International Patent Application No. PCT/US2004/035826, dated Dec. 7, 2007.

* cited by examiner

*Primary Examiner*—Sam Bhattacharya
(74) *Attorney, Agent, or Firm*—Frederick D. Bailey; Moore & Van Allen, PLLC

(57) ABSTRACT

A method of automatically answering a mobile phone. A mobile phone receives an incoming call and detects the calling party's phone number using a caller ID function. The mobile phone then determines if the calling party's phone number has been flagged as a phone number capable of causing the mobile phone to answer itself. If it is, the mobile phone automatically answers the call.

10 Claims, 1 Drawing Sheet

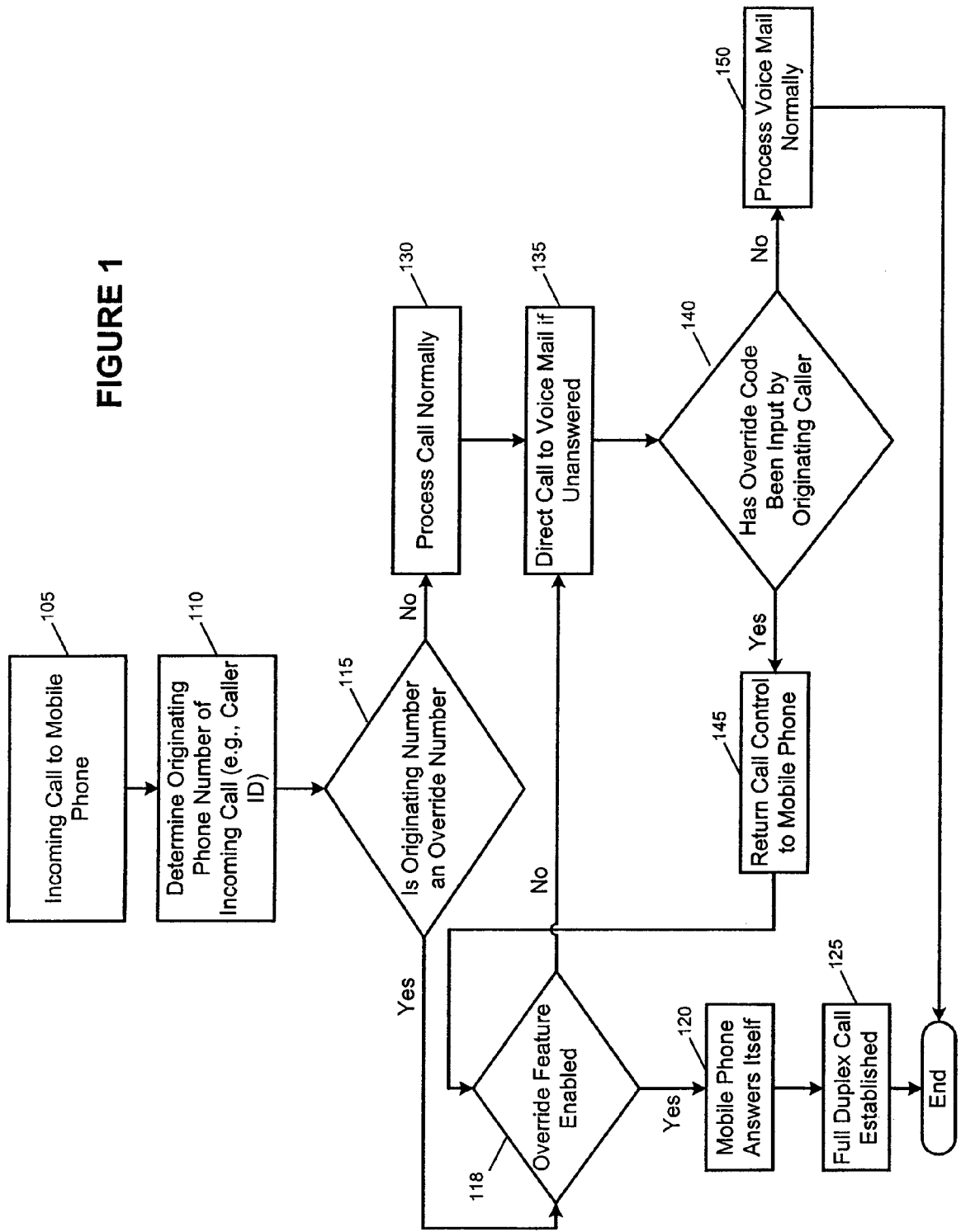

CALL OVERRIDE FEATURE FOR MOBILE PHONES

BACKGROUND OF INVENTION

The advent and proliferation of mobile phones has provided mobile phone users with a great deal of flexibility in telecommunications. Users can remain in contact with others without having to be near a fixed landline. Mobile phones afford many users a level of comfort that they can be contacted in emergency situations if necessary. This is especially comforting to parents that have left their children in the care of a babysitter. A situation that has not been addressed to date, however, is contacting a mobile user that is not answering their mobile phone. For instance, parents may be worried about elderly relatives or even teenage children if they fail to answer their mobile phone when called. In such cases, the caller may become worried that there is a physical reason that the called party can not answer their mobile phone. The mobile user may require assistance and not have the ability to contact someone.

What is needed is a means for establishing a connection when calling a mobile phone even if the user does not specifically answer the call.

SUMMARY OF INVENTION

The present invention describes a method of automatically answering a mobile phone. A mobile phone receives an incoming call and detects the calling party's phone number using a caller ID function. The mobile phone then determines if the calling party's phone number has been flagged as a phone number capable of causing the mobile phone to answer itself. If it is, the mobile phone automatically answers the call.

The mobile phone answers itself only after a pre-set number of rings giving the user time to answer the call on their own. To determine if the mobile phone should answer itself, the calling party's phone number is checked against a list or table in the mobile phone's memory, a server, or other location that contains one or more phone number entries. These entries have been identified as incoming calling phone numbers capable of causing the mobile phone to answer itself. In another implementation, the mobile phone's contact/phonebook entries are accessed to determine if the incoming phone number matches a phone number in the mobile phone's internal phonebook. If a match is found, it is determined whether an override flag or other detection means has been set for the phone number. The override flag is capable of causing the mobile phone to answer itself.

In another embodiment, the mobile phone receives a call. If the call is not answered within a pre-set number of rings it is diverted to a voice mail feature. The voice mail feature monitors the keypad entries input by the calling party. If the keypad entries input by the calling party match a pre-set code, then control of the call is returned to the mobile phone which automatically answers the call.

BRIEF DESCRIPTION OF DRAWINGS

FIG. 1 is a flowchart detailing the steps of the method of the present invention as well as the functions of any software used to implement the present invention.

DETAILED DESCRIPTION

The present invention can be implemented by software within the mobile phone that can automatically answer the phone and establish a connection when certain originating phone numbers place a call to the mobile phone. This feature can be particularly useful to check up on mobile phone users such as the elderly or children. Caregivers may wish to check up on an elderly relative when they are not with them. This feature enables the mobile phone to establish a call even if the mobile phone user has not answered. The caller can then listen for activity to try to determine if there is a situation that needs specific attention. In addition, if the mobile phone is equipped as a speakerphone, the caller can project their voice into the room to try to establish contact with the mobile phone user. If the mobile phone user answers back, the caller can assess whether everything is alright or if the mobile phone user requires further assistance.

FIG. 1 is a flowchart detailing the logic flow for the present invention. The first step in the process is for the mobile phone to detect an incoming call 105. The originating phone number is then determined 110 using a "caller ID" function before the mobile begins alerting of the call.

Caller ID provides the mobile phone user a visual indicator of who is calling in the form of an originating phone number in the mobile's display. Typically, if the mobile phone user wishes to screen her calls, she can simply not answer the call based on the incoming phone number. While caller ID merely provides the incoming phone number, other features of the mobile phone can utilize that information to enhance the user experience.

For instance, caller ID data can be matched against the mobile phone's contact data. If there is a match, the mobile phone can display the name of the incoming caller as it is entered in the contact database as opposed to the incoming phone number. Seeing the name "Jane" on your display is often more informative and intuitive than seeing "555-1234" and trying to figure out whose number it is. In addition, many mobile phones can display images. The images can also be linked to contacts in the database. Thus, if "Jane" calls and there is a picture linked to her contact data, her picture will appear in the display instead of a name or number. The present invention uses the caller ID number data as the basis for another added value feature associated with the mobile phone.

The incoming phone number is then checked 115 to see if it has been classified as an override number. If it is an override number, then the mobile phone determines if the override feature is enabled or disabled 118. If disabled, the call will be re-directed to a voice mail service. If enabled, the mobile phone will answer itself 120 after a certain number of rings rather than be directed to voice mail. Once answered, a full duplex call connection is established 125. Moreover, if the mobile phone has a speakerphone capability, the caller can speak and his voice will be projected into the area surrounding the mobile phone.

If the incoming number is not an override number the call is processed normally 130. If the call is not answered after a certain number of rings it will likely be directed to a voice mail service 135. There is an additional opportunity to implement the override feature. The mobile phone user can set an override code in voice mail such that entering the code will send control of the call back to the mobile phone. When voice mail is entered a background override process is initiated that monitors 140 the initial keypad entries of the caller. The code can be given to other individuals at the user's discretion. When a caller reaches voice mail she can enter the pre-set code and control of the call will be returned to the mobile phone 145 to be processed as an override call. If no override code is entered, the voice mail feature functions normally 150.

The override code allows the override feature to be activated even if an override number is not the originating number. This is important because a caregiver may not be able to call from a phone associated with an override number. The caller could be away from home or their mobile may have a dead battery. In such cases they must use another phone that is not associated with an override number to check in with the mobile user.

There can be multiple implementations to determine whether the originating number is an override number. The mobile phone can store a table or list of override numbers that can be edited by the mobile phone user. This table or list may be accessed when an incoming call is detected to determine whether to activate the override feature. Another implementation would be to include an override flag in the mobile phone's contact/phonebook feature. The mobile phone user could enable or disable an override flag for each contact in the phonebook. Thus, when a call comes in and the number is matched to one in the contact database, the override flag is checked and the override feature can be activated. A table/list of phone numbers would also include all permutations of the phone number including a 7 digit local call as well as a 10 or 11 digit out of area call. Thus, if the caller ID function displays the 7 digit number or a 10 or 11 digit number with area code attached, the override feature would still recognize the number. The same principle applies to phone numbers stored in the contact/phonebook database of the mobile phone. While this disclosure refers to standard U.S. telephone nomenclature, it can readily be adapted for use in other countries that utilize different telephone number nomenclatures.

There are times when the mobile user may wish to purposely deactivate the override feature. For instance, the user may wish to deactivate the feature during meetings or while at a theater, in a restaurant, or the like. If the user deactivates the override feature, then the mobile phone will not answer itself regardless of the originating phone number. Conversely, there may be times when the override feature will not be permitted to be deactivated. Caregivers may always want to be able to monitor those in their care. Similarly, parents may always want to be able to reach their teenage children. Thus, access to the override feature may be controlled by a code or personal identification number (PIN). That way, the person most interested in having access to the mobile user can control the override feature.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

The invention claimed is:

1. A method of automatically answering a mobile phone comprising:
   receiving a call;
   detecting the calling party's phone number using a caller ID function;
   determining if the calling party's phone number has been flagged as a phone number capable of causing the mobile phone to answer itself; and
   automatically answering the call when the calling party's phone number is flagged as a phone number capable of causing the mobile phone to answer itself creating a full-duplex connection with the calling party.

2. The method of claim 1 wherein the mobile phone answers itself only after a pre-set number of rings.

3. The method of claim 2 wherein the determining if the calling party's phone number has been flagged as a phone number capable of causing the mobile phone to answer itself comprises:
   accessing a table containing one or more phone number entries that have been identified as incoming calling phone numbers capable of causing the mobile phone to answer itself.

4. The method of claim 2 wherein the determining if the calling party's phone number has been flagged as a phone number capable of causing the mobile phone to answer itself comprises:
   accessing the mobile phone's contact/phonebook entries to determine if the incoming phone number matches a phone number in the mobile phone's internal phonebook; and
   determining whether an override flag has been set for the phone number in the mobile phone's internal phonebook when a match is found, said override flag capable of causing the mobile phone to answer itself.

5. A method of automatically answering a mobile phone comprising:
   receiving a call;
   diverting the call to a voice mail feature if the call is not answered within a pre-set number of rings;
   monitoring the keypad entries input by the calling party;
   determining if the keypad entries input by the calling party match a pre-set code;
   returning control of the call to the mobile phone when the keypad entries input by the calling party match the pre-set code; and
   automatically answering the call creating a full-duplex connection with the calling party.

6. A system for automatically answering a mobile phone comprising:
   means for receiving a call;

means for detecting the calling party's phone number using a caller ID function;

means for determining if the calling party's phone number has been flagged as a phone number capable of causing the mobile phone to answer itself; and means for automatically answering the call when the calling party's phone number is flagged as a phone number capable of causing the mobile phone to answer itself creating a full-duplex connection with the calling party.

7. The system of claim 6 wherein the mobile phone answers itself only after a pre-set number of rings.

8. The system of claim 7 wherein the means for determining if the calling party's phone number has been flagged as a phone number capable of causing the mobile phone to answer itself comprises:

means for accessing a table containing one or more phone number entries that have been identified as incoming calling phone numbers capable of causing the mobile phone to answer itself.

9. The system of claim 7 wherein the means for determining if the calling party's phone number has been flagged as a phone number capable of causing the mobile phone to answer itself comprises:

means for accessing the mobile phone's contact/phonebook entries to determine if the incoming phone number matches a phone number in the mobile phone's internal phonebook; and means for determining whether an override flag has been set for the phone number in the mobile phone's internal phonebook when a match is found, said override flag capable of causing the mobile phone to answer itself.

10. A system for automatically answering a mobile phone comprising:

means for receiving a call;

means for diverting the call to a voice mail feature if the call is not answered within a pre-set number of rings;

means for monitoring the keypad entries input by the calling party;

means for determining if the keypad entries input by the calling party match a pre-set code;

means for returning control of the call to the mobile phone when the keypad entries input by the calling party match the pre-set code; and means for automatically answering the call creating a full-duplex connection with the calling party.

\* \* \* \* \*